United States Patent
Bory

[11] 3,881,107
[45] Apr. 29, 1975

[54] APPARATUS FOR REGULATING THE POSITION OF A LASER LIGHT SOURCE TRANSMITTING A LIGHT BEAM

[75] Inventor: Michael Bory, Zurich, Switzerland

[73] Assignee: Werkzeugmaschinenfabrik Oerlikon-Buhrle AG, Zurich, Switzerland

[22] Filed: Dec. 13, 1973

[21] Appl. No.: 426,720

[30] Foreign Application Priority Data
Dec. 18, 1972 Switzerland............. 18412/72

[52] U.S. Cl................ 250/234; 356/138; 250/578; 331/95
[51] Int. Cl.............................................. H01j 3/14
[58] Field of Search............... 356/138, 141, 153; 250/203, 578, 234; 331/95 A, 95 S, 95 T; 408/8, 16, 13

[56] References Cited
UNITED STATES PATENTS
| | | |
|---|---|---|
| 3,528,748 | 9/1970 | Burch et al.......................... 356/138 |
| 3,696,248 | 10/1972 | Cunningham et al...... 331/94.5 A X |
| 3,752,589 | 8/1973 | Kobayashi........................ 356/138 X |
| 3,764,220 | 10/1973 | Billman et al................... 356/138 X |

*Primary Examiner*—Walter Stolwein
*Attorney, Agent, or Firm*—Werner W. Kleeman

[57] ABSTRACT

An apparatus for regulating the position of a laser light source transmitting a light beam as a function of the position of the transmitted light beam with respect to a beam detector stationarily arranged at the path of the light beam. The laser light source is universally suspended at its one end, at its other end there engage adjustment elements in a plane substantially perpendicular to the light beam and in two directions which are perpendicular to one another. Further, there are provided regulating circuits containing the adjustment elements and the detector by means of which the light beam is stabilized in its direction.

2 Claims, 2 Drawing Figures

APPARATUS FOR REGULATING THE POSITION OF A LASER LIGHT SOURCE TRANSMITTING A LIGHT BEAM

BACKGROUND OF THE INVENTION

The present invention relates to a new and improved apparatus for the regulation of the position of a laser light source transmitting a light beam as a function of the position of the transmitted light beam with respect to a stationary beam detector which is arranged in the path of the light beam.

It is known to linearly guide movable machine components by means of a laser light beam. According to one such prior art apparatus, it has been assumed that the laser light beam which forms the reference value does not spatially change its position. However, it has been found that particularly owing to thermal effects the laser light source can change its position. The slightest positional change of the light source at large distances however requires a considerable positional change of the light beam.

SUMMARY OF THE INVENTION

Hence, it is a primary object of the present invention to provide an improved apparatus for the regulation of the position of a laser light source which transmits a light beam and which apparatus is not associated with the aforementioned drawbacks and limitations of the prior art proposals.

Another object of the present invention aims at preventing the aforementioned change in the position of the light source.

Now in order to implement these and still further objects of the invention, which will become more readily apparent as the description proceeds, the apparatus of this development contemplates that the laser light source is universally suspended at one of its ends, at its other end there engage adjustment elements in a plane essentially perpendicular to the light beam in two directions which are essentially perpendicular to one another, and that there are arranged regulating circuits containing the adjustment elements and the detector by means of which the light beam is stabilized in its direction.

BRIEF DESCRIPTION OF THE DRAWING

The invention will be better understood and objects other than those set forth above, will become apparent when consideration is given to the following detailed description thereof. Such description makes reference to the annexed drawing wherein.

DETAILED DESCRIPTION OF THE PREFERRED EMBODIMENTS

Figure 1:
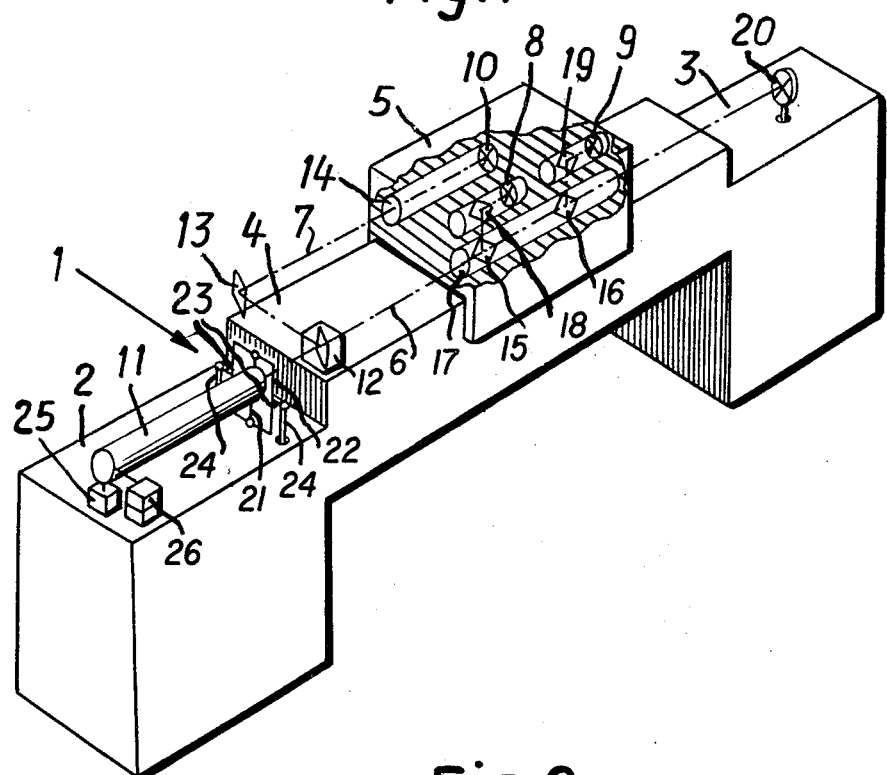
FIG. 1 schematically illustrates the construction of a machine equipped with a light-beam positionally oriented machine component.

Describing now the drawing, according to the showing of FIG. 1 there is provided a machine bed 1 of any suitable machine tool which has not been illustrated in greater detail, this machine bed 1 having two consoles or brackets 2, 3 between which there extends a bridge-shaped component 4. The surface of the bridge-shaped component 4 is constructed as a guide track for a carriage 5. Carriage 5 is guided by means of two laser-light beams 6, 7 in a prescribed or predetermined plane. For this purpose there are arranged three beam detectors 8, 9 and 10 at the carriage 5. The beam detectors 8 and 9 are aligned with the laser light beam 6 and the beam detector 10 with the laser light beam 7.

The carriage 5 is supported by means of any suitable and therefore no particularly illustrated adjustable hydrostatic sliding bearings at the guide track. The adjustment of the hydrostatic sliding bearing occurs through the agency of regulation circuits as a function of the signals measured at the detectors 8, 9 and 10 in a manner known in this particular art and, for instance, disclosed U.S. Pat. No. 3,713,746 and in Swiss Pat. No. 521,821 the disclosure of which is incorporated herein by reference and to which reference may be readily had.

Both of the laser light beams 6, 7 are derived from a laser light source 11 in that, along the path of the light beam transmitted by the laser light source 11, there are arranged a beam divider or splitter 12 and a deflecting mirror 13. The branched-off light beam 7 impinges upon the beam detector 10 arranged in a bore 14 at the carriage 5. The light beam 6 which passes through the beam divider 12 without being affected impinges upon further beam dividers or splitters 15, 16 which are arranged behind one another in a further bore 17 of the carriage 5. The light beams branched-off the beam dividers 15, 16 are diverted via the deflecting mirrors 18, 19 to the beam detectors 8, 9. The light beam which, without being affected, passes through the beam dividers 15, 16 departs from the bore 17 at the carriage 5 and impinges against a beam detector 20 stationarily arranged at the console or bracket 3.

The laser light beam 11 is universally suspended, that is, with a universal-type or Cardan joint at its end from which departs the light. To this end the light source 11 is rotatably mounted about a vertical shaft or axle 21 in a frame 22. Frame 22 is pivotably mounted about a horizontal shaft or axle 23 at two supports or uprights 24 which are fixedly connected with the console 2. The opposite end of the laser light source 11 bears against adjustment elements 25, 26. These adjustment elements 25, 26 are effective in a plane perpendicular to the transmitted light beam upon the laser light source, so that the effective directions both adjustment elements 25, 26 are perpendicular to one another.

Figure 2:
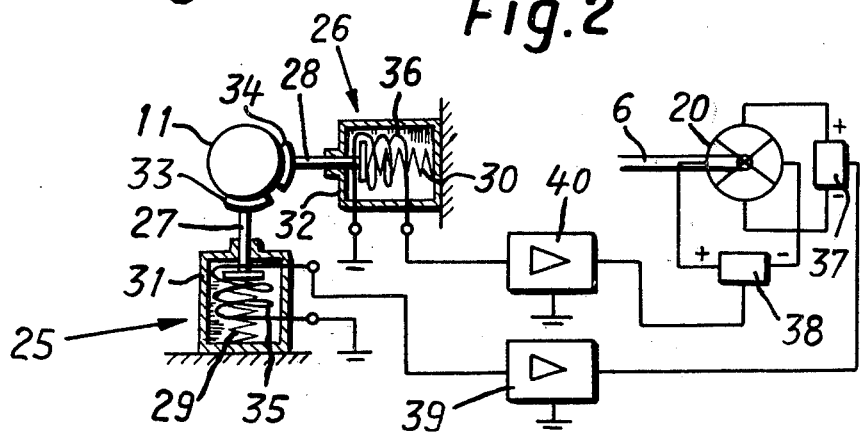
FIG. 2 illustrates the positional regulation means for a laser light source.

According to the showing of FIG. 2, the adjustment elements 25 and 26 are provided in each case with iron cores 27 and 28 respectively, which bear through the agency of compression or pressure springs 29 and 30 at the floor of the associated housings 31 and 32 respectively. The iron cores 27 and 28 engage with bowl-shaped supports or carriers 33 and 34 at the laser light source 11; on the other hand they partially extend into the magnetic coils 35 and 36, as shown. The control of the magnetic coils 35, 36 is undertaken by the beam detector 20 via intermediately arranged differential amplifiers 37, 38 and the control or regulation amplifiers 39, 40 which are arranged thereafter. Structure suitable for this purpose has been disclosed in U.S. Pat. NO. 3,764,220, granted Oct. 9, 1973.

The mode of operation of the previously described apparatus is as follows:

If the light beam 6 which impinges the beam detector 20 migrates out of the center of such detector, then the signals appearing at the four outputs of the detector 20 will possess different signal values and the differential amplifiers 37, 38 will deliver a differential signal which, following amplification at the regulation or control amplifiers 39 and 40, constituting regulators or controls, acts upon the magnetic coils 35, 36, resulting in the correction of the position of the last light source 11 such that the light beam 6 again impinges at the center of the beam detector 20. The laser light source 11 is adjusted in that there is continuously transmitted a direct-current to the magnetic coils 35, 36, with the result that the iron cores 27, 28 are retracted to a certain degree into the magnetic coils 35, 36 against the force of the springs 29, 30. This adjustment current is superimposed in each instance upon the regulating current derived from the migration of the beam.

The positional change of the laser light source 11 —brought about for instance by thermal effects— only occurs very slowly. Consequently there is achieved the result that brief fluctuations in the light beam which, for instance, can be erroneously identified by the detector 20 as a change in the position of the light source 11 owing to for instance tilting or canting of the carriage 5, are without influence upon the positional regulation of the light source 11.

While there is shown and described present preferred embodiments of the invention, it is to be distinctly understood that the invention is not limited thereto, but may be otherwise variously embodied and practiced within the scope of the following claims.

Accordingly, what is claimed is:

1. A machine tool including a machine bed, a laser light source, transmitting a light beam, means for supporting said laser for universal movement at one end thereof on said machine bed, adjustment elements engaging with the laser light source at its other end in a plane essentially perpendicular to the light beam and in two directions which are essentially perpendicular to one another, a beam detector fixed on said machine bed and arranged at the path of travel of the light beam for adjusting the position of said laser light source by means of said adjustment elements as a function of the position of the transmitted light beam with regard to said beam detector and to said machine bed.

2. A machine tool including a machine bed, a machine carriage guided on said machine bed, a laser light source transmitting a light beam means for supporting said laser for universal movement at one end thereof on said machine bed, adjustment elements engaging with the laser light source at its other end in a plane essentially perpendicular to the light beam and in two directions which are essentially perpendicular to one another, a first beam detector fixed on said machine bed and arranged at the path of travel of the light beam, for adjusting the position of said laser light source by means of said adjustment elements as a function of the position of the transmitted light beam with regard to said beam detector, further beam detectors on said carriage for determining the position of the carriage with respect to the light beam, the carriage being arranged between the laser light source and said first beam detector, beam dividers and deflecting mirror means fixed on said carriage, and wherein the beam detectors on the carriage are arranged in the path of travel of light beams branched-off from the light beam via said beam dividers and deflecting mirror means.

* * * * *